May 7, 1968 G. D. ALEXANDER 3,382,123

METHOD AND APPARATUS FOR MAKING FILAMENTOUS MATS

Original Filed March 23, 1962

INVENTOR.
GILBERT D. ALEXANDER
BY Edward M. Steuterman
ATTORNEY 3,382,123
METHOD AND APPARATUS FOR MAKING
FILAMENTOUS MATS
Gilbert D. Alexander, Louisville, Ky., assignor to American Air Filter Company, Inc., Louisville, Ky., a corporation of Delaware
Continuation of application Ser. No. 181,942, Mar. 23, 1962. This application July 11, 1966, Ser. No. 564,440
4 Claims. (Cl. 156—167)

ABSTRACT OF THE DISCLOSURE

A method for making a filamentous mat by drawing filaments from a feeder, axially reciprocating the feeder back and forth along the down-turning edge of a rotating drum so the filaments are drawn from the feeder to the drum, cyclically shifting a portion of the filaments back and forth out of a direct path from the feeder to the drum at an intermediate location between the drum and the feeder, and splitting the mat axially of the drum and removing it as a flat mat.

---

This is a continuation of application Ser. No. 181,942, filed Mar. 23, 1962, now abandoned.

One method of forming filamentous mats of a certain character is carried out by steps including: winding continuous glass fiber filaments, issuing from a traversing glass furnace, onto a rotating drum in a back and forth helical pattern to build up a compact cylindrical mat of successive layers of filaments, with the filaments of adjacent layers lying in crossing relation; slitting the cylindrical mat in an axial direction and removing it from the drum to provide a planar compact mat; and then further processing the mat by stretching it in a direction generally transverse to the lay of the filaments. A binder or other materials may be applied to the mat as it is being spun on the drum, after it is removed therefrom, or during the stretching operation. The mat may be compressed in thickness after or during stretching for ultimate use as a reinforcing or surfacing mat or the like in a plastic laminate, or may be left in a substantially expanded form for other uses such as an air filter or the like where a thicker pad is desired. Detailed teachings relating to the foregoing are found in a number of patents and patent applications including Jackson U.S. Patent 2,798,531, Jackson U.S. application S.N. 621,907, and Beckner U.S. application S.N. 822,846, for example.

Summary of the invention

The present invention relates to a process of that general type and includes among its objects the provision of a process: for making a compact mat having a novel structural character with respect to both the shape and the intercrossing relationship of the filaments, this structural character directly affecting the re-orientation of the filaments during stretching of the mat and thus having significance in connection with the structural character of the stretched mat; wherein the filaments may be wound on a drum with portions thereof at a substantial angle while moving the glass furnace at a relatively low speed; and which readily lends itself to producing mats of one character and another depending upon the end product desired.

In accordance with the invention, the filaments are wound on the drum in wavy or sinuous form with the center lines of the sinuous forms advancing back and forth between the end areas of the drum in generally helical fashion. Stated in another way, each wavy filament may be characterized as having a sinusoidal shape about an axis that advances back and forth between the opposite end areas of the drum in the form of a helix.

The process may be carried out by feeding filaments from a reciprocating glass furnace or other feeder to a rotating drum and relatively rapidly shifting the portions of the filaments intermediate the feeder and drum in one axial direction (relative to the drum axis) and then the other axial direction by means traversing the drum along with the furnace. The shifting means comprise contacting surfaces which oscillate back and forth while the filaments pass over them in their passage from furnace to drum. The shifting means are preferably carried in depending relation from the furnace carriage. The furnace may be arranged to traverse the drum at a relatively low speed compared to conventional practice, while the filament contacting surfaces shift back and forth, say, once or twice during each revolution of the drum. The amplitude or throw of the contacting surfaces may be adjusted to give an average angle of the portions of the filament extending between the troughs and crests of the sinuous form well in excess of the helical angles cencountered in the conventional mat spinning practice. These angles may be attained while moving the furnace relatively slowly to obtain the advantages attendant a slow speed furnace.

The structure of a planar compact mat (i.e., a cylindrical compact mat which has been slit axially, removed from the drum and laid flat preparatory to stretching) having the sinuous pattern of filaments obtained in accordance with the invention is different from the structure of a conventional mat in several respects. First, the filaments are sinuous in form rather than substantially straight. Also, the number of intersections of filaments in one layer with filaments in a preceding or successive layer may be greater than with a conventional mat. Further, the portion of a filament lying between a trough and crest of the sine wave form, will extend farther in a lateral direction (a lateral direction in the planar compact mat corresponding to an axial direction of the mat on the drum) than a corresponding length of filament in a conventional mat.

The invention will be described in connection with the accompanying drawing wherein.

Figure 1:
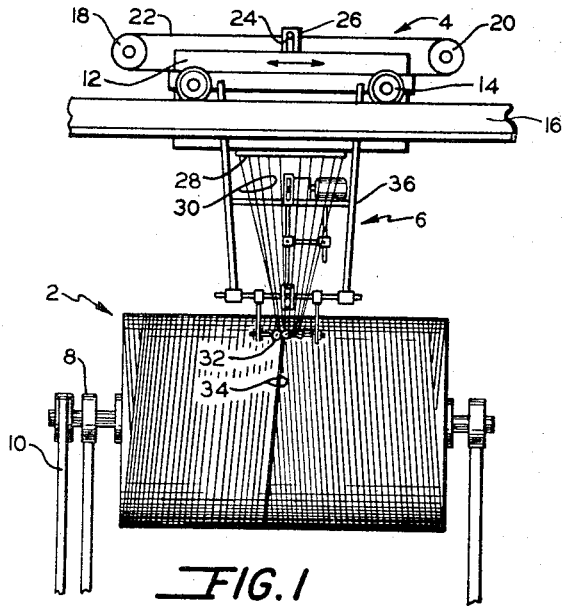
FIGURE 1 is a fragmentary, somewhat diagrammatic front view of apparatus for winding a cylindrical compact mat in accordance with the principles of the invention.
Figure 2:
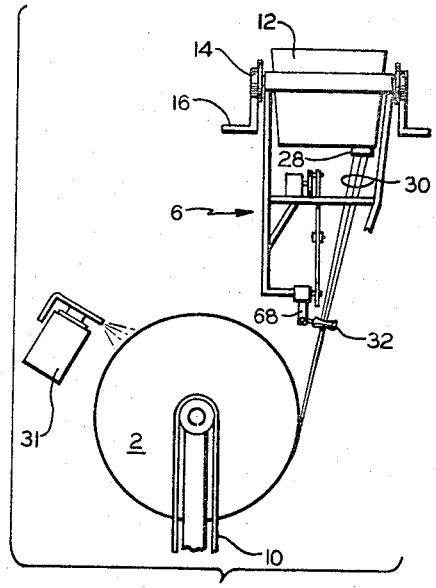
FIGURE 2 is a partly broken end view of the apparatus of FIGURE 1.

The apparatus as shown in FIGURES 1 and 2 for winding a compact filamentous mat generally includes a rotatable drum 2 upon which the glass fiber filaments are wound, a reciprocating glass furnace assembly generally designated 4 which moves back and forth along the drum and from which the filaments issue and pass onto the winding surface of the drum, and an oscillating mechanism generally designated 6 depending from the furnace assembly so that it moves back and forth along the drum with the furnace assembly.

The drum 2 has opposite end shafts journaled for rotation in bearing supports 8 and is rotated by means of a belt 10 driven by a suitable power source (not shown) engaging a pulley keyed to the shaft of the drum. The glass furnace 12 is supported for reciprocation in a path above and between the ends of the drum on rollers 14 riding on spaced rails 16. The driving means for the furnace includes, for example, a drive sprocket 18, and idler sprocket 20, and an endless chain 22 carrying a pin slidably engaging a slot 24 in bracket 26 mounted on furnace 12. The bottom wall of the furnace includes an orifice plate 28 having a number of spinnerets through which a corresponding number of individual glass filaments 30 descend from the furnace. A binder applicator 31 may be used to apply a binder to the filaments as they are wound on the drum in certain cases.

The furnace 12 is supported in an open-work frame which also supports the depending oscillating mechanism 6. The mechanism 6 includes a pair of spool-shaped elements 32 carried from the bottom portion of the frame and arranged to be reciprocated in short strokes as the frame moves back and forth in long strokes traversing the length of the drum. The period of the spool reciprocation is relatively short as compared to the period for the frame to traverse the drum in both directions. The filaments 30 are grouped together into ribbons 34 as they pass along the contacting circumferential surfaces of the spools in their descending passage from the furnace to the drum. With the oscillating mechanism 6 causing the spools to reciprocate, the ribbons 34 are wound on the drum in the wavy or sinuous configuration.

Figure 3:
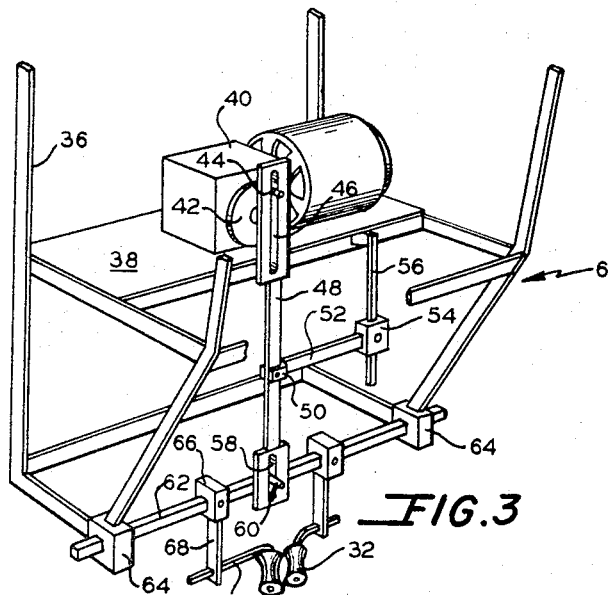
FIGURE 3 is a partly broken isometric view of one type of oscillating mechanism and the supporting frame therefor.

Details of one suitable oscillating mechanism, perhaps best understood from FIGURE 3, will now be described. The openwork frame generally designated 36, supported by the rails 16 and carrying the glass furnace (not shown in FIGURE 3) includes an intermediate horizontal platform or base 38 supporting an electric motor-gear reducer assembly 40. A rotatable disc 42 driven by the reducer has an eccentrically mounted forwardly projecting pin 44 engaging the slot 46 provided in the upper end portion of the generally vertically disposed lever 48. The lever 48 is pivotally supported at a selected vertical location by a forked end or socket 50 of horizontal bar 52 which has its other end 54 secured at a selected location on the stationary vertical bar 56. The upper end of the stationary bar 56 is secured to the platform 38.

The lower end of the vertical lever 48 is provided with a slot 58 which receives a projecting pin 60 fixed to the horizontal slide bar 62. The slide bar 62 is supported near its ends in opposite slide bearings 64 which are in turn carried by the lower portion of the frame.

It will thus be appreciated that the vertical lever 48 operates as a first order lever fulcrumed in the socket 50, and that the rotating motion of the disc 42 is converted to the horizontal sliding motion of the slide bar 62. The throw of the horizontal slide bar 62, with a fixed eccentricity of the pin 44 on the disc will, of course, be dependent upon the vertical position of the fulcrum. This may be adjusted by sliding the block 54 up or down on the vertical fixed bar 56, it being noted that the vertical slots 46 and 58 at the upper and lower ends of the lever 48 must be sufficiently long to accommodate the adjustment. An alternative arrangement for adjusting the throw of the slide bar without moving the vertical lever 48 as a whole up or down may be provided by a series of vertically spaced holes in the lever 48, each of which will provide a different fulcrum when connected to socket 50.

The rotatable spools 32 are carried from the slide bar 62 through blocks 66 fixed thereto and to which depending bars 68 are secured. The spool axles 70 are fastened to the bottom ends of bars 68 and are arranged so that the circumferential contacting surfaces of the opposite spools will displace the descending filaments inwardly from both edges of the curtain of filaments issuing from the furnace. Preferably the axles of the spools are disposed at an angle to the axis of the drum as shown in FIGURE 3 so that the possibility of filaments breaking because of the reciprocating action is lessened. The blocks 66 are adjustable on the slide bar 62 so that the desired spacing of the spools may be attained. Presently preferred practice is to space the spools only slightly apart, i.e., sufficiently closely to obtain a ribbon of less than 1" in width.

Figure 4:
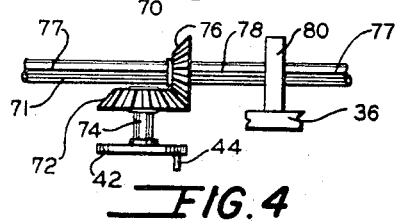
FIGURE 4 is a fragmentary view of an alternative drive arrangement for the oscillating mechanism.

It will be appreciated that the oscillating mechanism described may be varied in mechanical details without departing from the scope of the invention. For example, the independent electric motor and gear reducer assembly may be eliminated if the oscillating mechanism is to be driven from the same power source as the rotating drum. A fragmentary portion of an arrangement for so driving the mechanism is shown in FIGURE 4. In that case a horizontal shaft 71 extending for at least the length of the drum and along the back of the frame 36 is rotated at a reduced speed relative to the drum speed and is supported by fixed bearings not shown beyond the ends of the drum. Bevel gears with intersecting axes are provided, one gear 72 being fixed to a shaft 74 which drives the disc 42, and the other bevel gear 76 being slidably mounted on the long horizontal shaft 71. A keyway 77 extending for substantially the length of the drum is provided in shaft 71 and a rather long key 78 therefor is secured to the gear 76 on the long shaft. The key is sized so that it can freely slide in the keyway, and has its end opposite to the end secured to gear 76 abutting a sliding bearing 80 on the long shaft 70. The bearing 80 is fixed to the frame 36 at the correct distance from the bevel gear 72 so that key 78 maintains the gears in meshing relation as the frame 36 moves back and forth.

In practicing the invention, the drum 2 is rotated and the filaments 30 are fed from the furnace to the drum for winding thereon after being grouped into ribbons 34 by the closely spaced oscillating spools. If the spools were not independently reciprocated by the oscillating mechanism, the ribbons would be simply wound on the drum in a helical pattern directed in one way as the furnace moves from right to left, and directed in the other way as the furnace moves from left to right, with the helical angle of the ribbons being dependent upon the furnace speed relative to the drum speed. However, due to the independent oscillation of the spools imparted by the oscillating mechanism, the ribbons are wound on the drum with a sinuous or wavy configuration.

Figure 5:
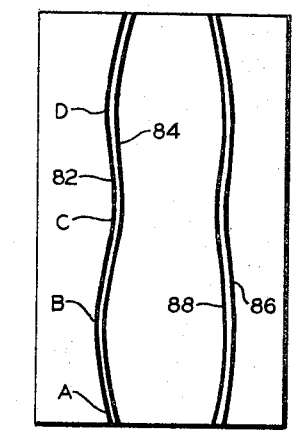
FIGURE 5 is a plan view, in reduced scale relative to FIGURES 1 and 2, of a compact planar mat before stretching, and illustrating one example of filament configuration obtainable in accordance with the principles of the invention.

The character of the sinuous patterns which may be formed on the drum will be explained in connection with FIGURE 5 which represents a compact cylindrical mat of filaments which has been slit axially, removed from the drum, and laid out flat to provide a planar compact mat. The cutting line corresponds with the top and bottom edges of the mat. The configuration of ribbons shown is based on the oscillating mechanism having a frequency of 2 cycles per revolution of the drum. Only four ribbons are shown in FIGURE 5, the two on the left illustrating the wave form two ribbons consecutively wound on the drum take as the furnace and oscillating mechanism travel toward the right end of the drum, and the two on the right illustrating the wave form two ribbons consecutively wound on the drum take as the furnace is moving to the left after having reached the right end area of the drum. It will be understood that the actual mat formed in accordance with the invention has such a multitude of filaments therein that it is difficult without a detailed and minute inspection to discern the pattern. It is also noted that the amplitude of the waves is exaggerated for purposes of illustration.

Assuming the furnace is moving toward the right, the end designated A of ribbon 82 will have been the first portion of that ribbon to be wound on the drum. The first crest designated B will than be formed while the spools move to their extreme left position and then back toward the right. As the spools then move to their extreme right position (which is in the same direction that the furnace and frame are moving at that time) and then back toward the left, the trough designated C will be formed on a drum. The successive crest D is then formed in the same fashion. The next ribbon 84 will then be wound on the drum with the crests and troughs paralleling the crests and troughs of ribbon 82. It will be appreciated that ribbon 84 is simply the convolution on the drum following ribbon 82, but they constitute separate ribbons in the cut mat. The lateral spacing between the ribbons in a single layer of the cut mat will be dependent upon the relationship between furnace and drum speeds.

The ribbons 86 and 88 indicate successive ribbons formed after the furnace and carriage have reached the right end area of the drum and have begun to travel back toward the left end area. As in the case of the ribbons 82 and 84, the wave forms are parallel, and the upper end of ribbons 86 is at the same location on the drum as the lower end of the successive ribbon 88. With the furnace and carriage traveling to the right as the ribbons 82 and 84 are wound on the drum, the center line of each of these ribbons would generate a helix moving toward the right end of the drum. Conversely with the furnace and carriage moving toward the left as ribbons 86 and 88 are wound, their center lines would generate a helix moving toward the left end of the drum. The helical angle of these center lines of the sinuous pattern depends upon the furnace and carriage speed relative to the drum speed.

It will be apparent that the character of the mat formed in accordance with the invention may be varied considerably by varying certain relationships of the operating parts. For example, the throw of the slide bar, and consequently the amplitude of the sinuous wave forms, may be varied by shifting the fulcrum 50 of the vertical lever 48 up or down. The frequency of the waves may be varied in a number of ways so that one or more whole cycles are completed with each revolution of the drum; and in some cases it may be desirable to have a fractional portion, or a complete and a fractional portion of a cycle for each revolution of the drum. Also, the furnace speed and drum speed may be varied relative to each other to change the helical angle of the center lines of the wave forms.

In the presently preferred operation, the furnace is driven at a very low rate of speed compared to the furnace speed in the conventional spinning practices. The furnace speed may be as low as one or two inches per minute. The mat formed at such relatively low speeds may still have a substantial number of intersections between the filaments in adjacent layers because of the throw of the spools causing the filaments to be wound in the sinuous form.

The spools may be spaced closely together so that substantially all of the filaments are wound in the sinuous pattern, or they may be spaced apart so that only edge portions of the total number of descending filaments are wound in the sinuous pattern. In the latter case, the number of filaments which are wound in a sinuous pattern will vary during each cycle of the oscillating mechanism.

It will be appreciated the described apparatus results in the filaments or ribbons being wound in sine wave form due to the harmonic motion inherent in the oscillating mechanism operation. However, the basic concept does not require that the wave forms be strictly sinusoidal in character, and other wave forms can be wound within the scope of the invention.

I claim:
1. A method for making a filamentous mat of successive overlying layers of filaments which includes: feeding filaments from a filament feeder; reciprocatingly traversing said feeder along a down-turning edge of a rotating drum so said filaments are wound on said rotating drum and rotating said drum a multiplicity of times during each traverse of said feeder so that said filaments are distributed axially along said rotating drum in successive overlying layers in accordance with successive traverses of said feeder; simultaneously collecting a portion of said filaments into multi-strand groups and cyclically shifting the collected filaments back and forth in an axial direction relative to said drum at an intermediate location between said reciprocatory feeder and said drum where each back-and-forth cycle is completed within a period of not more than one revolution of said drum so that said filaments are distributed axially along said drum in a sinuous pattern where filaments of each layer are in substantially parallel relation and successive turns of the same filament lie on said drum in generally parallel spaced relationship; and slitting the mat axially of the drum and removing the mat as a planar mat.

2. In the method of claim 1:
(a) shifting said filaments to a degree that the amplitude of displacement of the filaments on the drum during each cycle exceeds the traversing distance of said feeder during the same cycle.

3. Method for making compact filamentous mats comprising:
(a) moving a filament feeder axially back and forth along a longitudinal edge of a drum;
(b) rotating said drum a number of times during each traverse of said feeder;
(c) feeding filaments from said reciprocatingly traversing feeder to said drum to distribute said filaments axially along said drum to build up successive overlying layers of filaments on said drum;
(d) simultaneously collecting said filaments to form a collected group of filaments and displacing said collected group of filaments out of a direct path from said feeder to said drum at a location between said feeder and said drum in a cyclically repetitive harmonic motion, having an amplitude exceeding the travel of said feeder during a single displacing cycle during which cycle said drum makes less than one complete revolution so that filaments of each layer are wound on said drum in generally parallel relationship in a sinuous pattern about helically advancing center lines so successive turns of the same filament lie on said drum in mutually spaced generally parallel relationship; and
(e) slitting said mat axially of the drum and removing said mat from said drum as a planar mat.

4. Apparatus for making compact filamentous mats comprising:
(a) a rotating drum;
(b) a filament feeder disposed for movement in a back-and-forth path parallel to the longitudinal axis of said drum which path extends along a down-turning edge of said drum between the end areas of said drum;
(c) means for moving said filament feeder back and forth along said path; and
(d) contacting means connected to said filament feeder to move with said filament feeder for contacting at least a portion of said filaments in their passage from said filament feeder to said drum and means for cyclically shifting said contacting means back and forth in an axial direction over a small portion of the length of the drum at a rate in excess of the rate of travel of said filament feeder so that said contacting means is shifted through at least one cycle during each revolution of said drum and successive turns of said filament of the same layer are deposited on said drum in spaced relation in a sinuous pattern.

References Cited
UNITED STATES PATENTS

| | | | |
|---|---|---|---|
| 2,664,375 | 12/1953 | Slayter | 156—167 |
| 3,092,533 | 6/1963 | Beckner | 156—167 |
| 3,094,292 | 6/1963 | Hebberling | 242—43 |
| 3,109,602 | 11/1963 | Smith | 242—18 |
| 3,151,963 | 10/1964 | Cochran | 242—18 |

STANLEY N. GILREATH, *Primary Examiner.*